United States Patent
Wright

(10) Patent No.: US 10,974,176 B2
(45) Date of Patent: Apr. 13, 2021

(54) AUTOMATIC CONTROL OF BIOCHEMICAL OXYGEN DEMAND CONTENT (BOD) OF SLUDGE AND OTHER PRODUCTS OF A WASTE WATER TREATMENT SYSTEM

(71) Applicant: ClearCove Systems, Inc., Victor, NY (US)

(72) Inventor: Terry Wright, Rochester, NY (US)

(73) Assignee: Clear Cove Systems, Inc, Rochester, NY (US)

( * ) Notice: Subject to any disclaimer, the term of this patent is extended or adjusted under 35 U.S.C. 154(b) by 124 days.

(21) Appl. No.: 16/167,586

(22) Filed: Oct. 23, 2018

(65) Prior Publication Data
US 2019/0054399 A1 Feb. 21, 2019

Related U.S. Application Data

(62) Division of application No. 14/691,062, filed on Apr. 20, 2015, now Pat. No. 10,137,388.

(51) Int. Cl.

| | |
|---|---|
| *B01D 21/34* | (2006.01) |
| *C02F 11/12* | (2019.01) |
| *B01D 21/24* | (2006.01) |
| *B01D 21/30* | (2006.01) |
| *C02F 1/44* | (2006.01) |

(52) U.S. Cl.
CPC ......... *B01D 21/34* (2013.01); *B01D 21/2427* (2013.01); *B01D 21/2444* (2013.01); *B01D 21/305* (2013.01); *C02F 11/12* (2013.01); *C02F 1/44* (2013.01); *C02F 2209/006* (2013.01); *C02F 2209/08* (2013.01); *C02F 2209/10* (2013.01); *C02F 2209/11* (2013.01)

(58) Field of Classification Search
CPC ........... B01D 21/2427; B01D 21/2444; B01D 21/305; B01D 21/34; C02F 11/12; C02F 1/44; C02F 2209/006; C02F 2209/08; C02F 2209/10; C02F 2209/11
See application file for complete search history.

(56) References Cited

U.S. PATENT DOCUMENTS

| | | |
|---|---|---|
| 6,080,305 A | 6/2000 | Sandahl |
| 2006/0006114 A1 | 1/2006 | Deskins |
| 2013/0313191 A1 | 11/2013 | Wolf et al. |

*Primary Examiner* — Dirk R Bass
(74) *Attorney, Agent, or Firm* — Parker Butler LLC; Michael A. Butler

(57) ABSTRACT

A method of controlling an enhanced primary treatment (EPT) system that includes an EPT settling tank. A sludge drain discharges a sludge including BOD from the EPT settling tank and a clarified effluent discharge recovers decanted fluid from the EPT settling tank. A controller has at least one computer processor. A sludge sensor is communicatively coupled to the controller. The sludge sensor provides a sludge BOD concentration measurement, or a measurement from which the sludge BOD concentration is calculated. A process algorithm controls the sludge valve to control the discharge of the sludge by gravity or by pumping in response to data from the sludge sensor of the sludge BOD concentration.

6 Claims, 4 Drawing Sheets

AUTOMATIC CONTROL OF BIOCHEMICAL OXYGEN DEMAND CONTENT (BOD) OF SLUDGE AND OTHER PRODUCTS OF A WASTE WATER TREATMENT SYSTEM

CROSS REFERENCE TO RELATED APPLICATIONS

This Application is a Divisional of and claims priority to and the benefit of co-pending U.S. patent application Ser. No. 14/691,062, "AUTOMATIC CONTROL OF BIOCHEMICAL OXYGEN DEMAND CONTENT (BOD) OF SLUDGE AND OTHER PRODUCTS OF A WASTE WATER TREATMENT SYSTEM", filed Apr. 20, 2015, which application is incorporated herein by reference in its entirety.

FIELD OF THE APPLICATION

The application relates to waste water treatment and particularly to control of a BOD concentration of sludge and other treated products.

BACKGROUND

Waste water treatment systems, such as municipal waste water treatment plants accept biochemical oxygen demand content (BOD) rich waste fluids. Unfortunately, prior art treatment facilities inadvertently filter out otherwise useful BOD content that could be recycled, such as for energy generation applications, while filtering out undesired solid materials in the waste stream. Also, such facilities typically run without regard to optimizing recovery of BOD materials. Such facilities generally run all of the time, and only adjust or divert influent fluid streams when an influent flow rate exceeds a maximum flow rate that a given wastewater facility can handle.

SUMMARY

According to one aspect, an enhanced primary treatment (EPT) system includes an EPT settling tank having at least one influent feed system (IFS) fluidly coupled to an influent fluid pump which pumps an influent fluid having a biochemical oxygen demand content (BOD) into the IFS. The IFS has an IFS outflow which fills a settling volume of the EPT settling tank. A sludge drain discharges a sludge including BOD from the EPT settling tank and a clarified effluent discharge recovers decanted fluid from the EPT settling tank. A controller has at least one computer processor. A sludge sensor is communicatively coupled to the controller. The sludge sensor provides a sludge BOD concentration measurement, or a measurement from which the sludge BOD concentration can be calculated. The enhanced primary treatment (EPT) system also includes a sludge valve or a sludge pump. The sludge valve or the sludge pump is communicatively coupled to the controller to control a sludge discharge from the EPT settling tank by gravity, or a sludge pump communicatively coupled to the controller to control the discharge of the sludge including BOD by pumping. A process algorithm is configured to run on the controller. The process algorithm controls the sludge valve communicatively coupled to the controller to control the discharge of the sludge including BOD from the sludge drain by gravity or by pumping in response to data from the sludge sensor of the sludge BOD concentration.

In one embodiment, when the BOD concentration in the sludge falls below a pre-determined threshold value, the sludge valve or the sludge pump is closed or stopped by the controller and then after a predetermined settling time, the sludge valve or the sludge pump is opened or started.

In another embodiment, when the BOD concentration in the sludge falls below a pre-determined threshold value, the sludge valve or the sludge pump is closed or stopped by the controller and then after the BOD concentration in the sludge rises above the pre-determined threshold value, or another pre-determined threshold value, the sludge valve or the sludge pump is opened or started.

In yet another embodiment, the sludge sensor includes an ultraviolet absorption (UVa) spectrometer.

In yet another embodiment, the sludge sensor includes a total suspended solids (TSS) sensor.

In yet another embodiment, the sludge sensor includes a turbidity (TRB) sensor.

In yet another embodiment, the sludge sensor includes a chemical oxygen demand (COD) sensor.

In yet another embodiment, the sludge valve or the sludge pump is operated in a sludge flow mode where the sludge pump is energized or the sludge valve is open, and a sludge flow stopped mode where the sludge pump is de-energized or the sludge valve is closed.

In yet another embodiment, the EPT system further includes an influent fluid sensor communicatively coupled to the controller to provide an influent fluid BOD concentration measurement, or a measurement from which an influent fluid BOD concentration is calculated by the controller, an influent flowmeter, and a sludge flowmeter communicatively coupled to the controller wherein the process algorithm configured to run on the controller further controls a flowrate of the influent fluid by controlling the influent fluid pump and wherein a volume of fluid in the EPT settling tank and a flow rate of the sludge discharge is controlled in response to a measured or calculated BOD concentration of the influent fluid and a measured or calculated BOD concentration of the sludge.

In yet another embodiment, the influent fluid sensor includes an ultraviolet absorption (UVa) spectrometer.

In yet another embodiment, the influent fluid sensor includes a total suspended solids (TSS) sensor.

In yet another embodiment, the influent fluid sensor includes a turbidity (TRB) sensor.

In yet another embodiment, the influent fluid sensor includes a chemical oxygen demand (COD) sensor.

In yet another embodiment, the EPT system further includes a clarified effluent sensor communicatively coupled to the controller to provide a clarified effluent BOD concentration measurement, or a measurement from which a clarified effluent BOD concentration is calculated by the controller, a clarified effluent flowmeter communicatively coupled to the controller, and a clarified effluent modulating valve communicatively coupled to the controller, wherein the process algorithm configured to run on the controller further controls a flowrate of the influent fluid by controlling the clarified effluent modulating valve and wherein a volume of fluid in the settling tank and a flow rate of the sludge discharge is controlled in response to a measured or calculated BOD concentration of the influent fluid and a measured or calculated BOD concentration of the sludge and a measured or calculated BOD concentration of the clarified effluent.

In yet another embodiment, at least one or more controllable valves are operated by the controller to set a range of valve positions from closed to open, or wherein at least one or more pumps include a variable speed pump operated by the controller to set a desired pumping speed and the process algorithm causes the controller to control the EPT system by proportional control.

In one embodiment, the clarified effluent sensor includes an ultraviolet absorption (UVa) spectrometer.

In another embodiment, the clarified effluent sensor includes a suspended solids (TSS) sensor.

In yet another embodiment, the clarified effluent sensor includes a turbidity (TRB) sensor.

In yet another embodiment, the clarified effluent sensor includes a chemical oxygen demand (COD) sensor.

According to another aspect, a method of controlling an enhanced primary treatment (EPT) system includes the steps of: providing an EPT system having an EPT settling tank including a controller running a process algorithm configured to read at least a sludge sensor, and to control at least a sludge discharge valve or a sludge discharge pump coupled to the controller; measuring by use of the sludge sensor a biochemical oxygen demand content (BOD) concentration of a sludge discharge from a settling tank of the EPT system with a sensor communicatively coupled to a controller; controlling by the controller, a sludge discharge valve or a sludge discharge pump in response to the BOD concentration of a sludge discharge to automatically maintain a desired BOD concentration of the sludge discharge.

In one embodiment, the step of providing further includes providing an influent fluid sensor, an influent flowmeter, and a sludge flowmeter, and the step of measuring further include measuring a sludge flow rate, measuring an influent fluid flow rate, and measuring by use of the influent sensor a BOD concentration of the influent fluid, and the step of controlling further includes controlling an influent fluid pump and the sludge discharge valve or a sludge discharge pump in response to the BOD concentration of a sludge discharge, the BOD concentration of the influent fluid, the flow rate of the sludge discharge, and the flow rate of the influent fluid to automatically maintain a desired BOD concentration of the sludge discharge and a volume of influent fluid to be decanted within the EPT settling tank.

In another embodiment, the step of providing further includes providing a clarified effluent sensor, and a clarified effluent flowmeter, and the step of measuring further include measuring a clarified effluent flow rate, and measuring by use of the clarified effluent sensor a BOD concentration of a clarified effluent fluid decanted by the EPT settling tank, and the step of controlling further includes controlling a modulating clarified effluent valve in response to the BOD concentration of a sludge discharge, the BOD concentration of the influent fluid, the flow rate of the sludge discharge, and the flow rate of the influent fluid to automatically maintain a desired BOD concentration of the sludge discharge and a volume of influent fluid to be decanted within the EPT settling tank, and the BOD concentration of the clarified effluent.

In yet another embodiment, the step of controlling includes controlling at least one variable speed pump or at least one variable position valve under proportional control The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Sewage treatment systems should recover as much of the recyclable biochemical oxygen demand content (BOD) in the influent as possible. BOD recovery should be done as early as possible in the treatment process to maximize energy production. Also, early BOD recovery reduces the solid and fiber load on the downstream membranes/filters. A system and method for efficient early BOD recovery which uses an enhanced primary treatment (EPT) tank to increase the biological concentration in the energy producing effluent from about 0.1% in the prior art to 1% or more is described hereinbelow.

One challenge for waste water treatment plants is how to accommodate the highly variable and often unpredictable flow rate into the facility. Traditionally, this problem has been solved by designing each plant to handle the maximum expected flow. Such solutions based on maximum expected flow typically have less efficient operation during times when they are running well under their maximum capacity, such as when lesser flows are processed. One of the advantages of the EPT concept on which the various embodiments described hereinbelow are based, is that the EPT structures enable flow control, which together with sensors and a process control strategy or a process algorithm, can substantially increase the amount of BOD recovered from the influent early in the treatment process.

Figure 1:
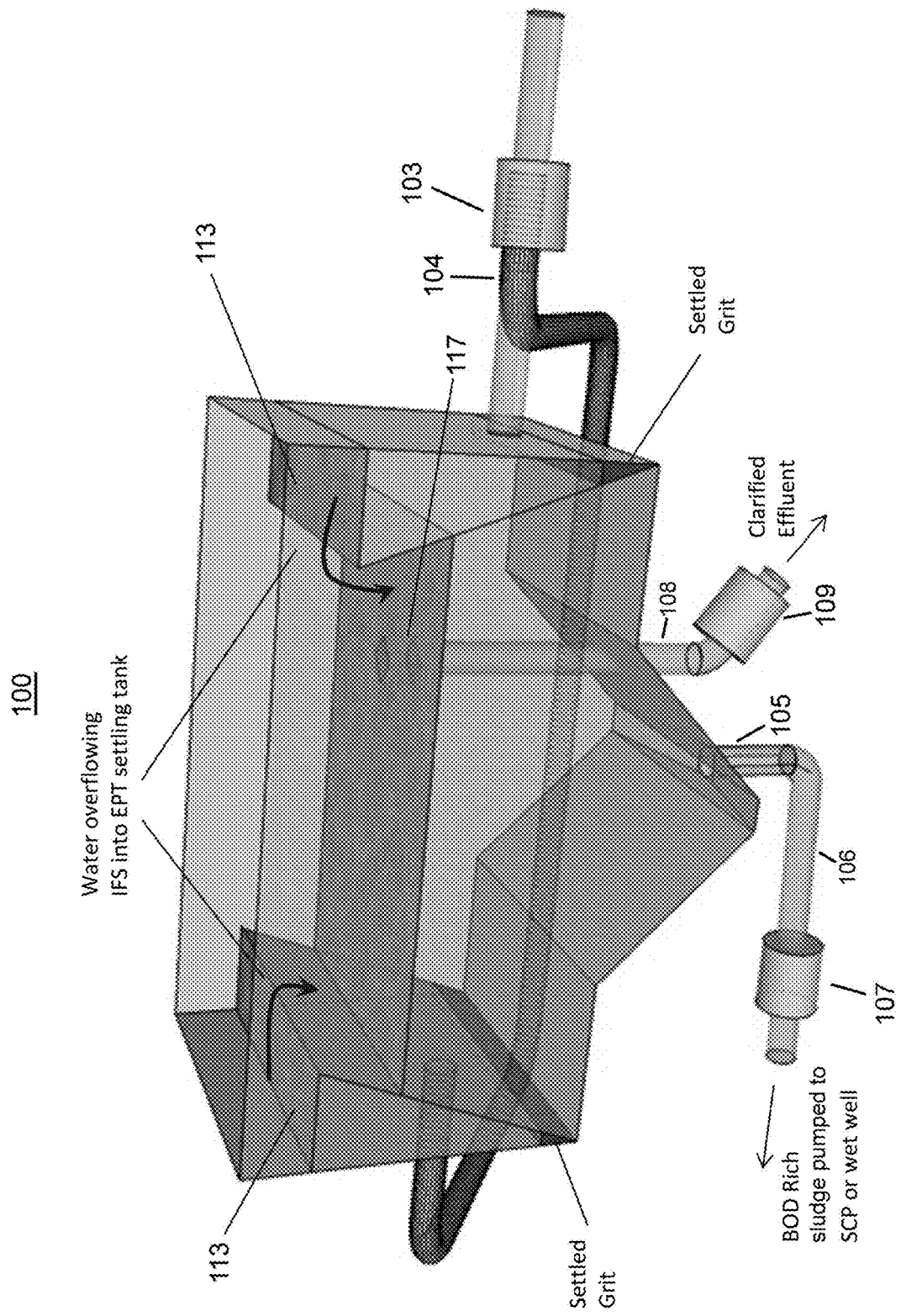
FIG. 1 shows a partial schematic diagram of an exemplary enhanced primary treatment (EPT) tank.

FIG. 1 shows a partial schematic diagram of the basic structure of an exemplary enhanced primary treatment (EPT) tank 100. In the EPT of FIG. 1, influent as wastewater with suspended solids is typically pumped into the influent feed system (IFS) 113 by an influent pump 103 followed by a flow split 104. The exemplary IFS 113 of the EPT of FIG. 1 include two or more troughs attached on the sides of the EPT main tank. Grit, including the highest density solids, settles to the bottom of the IFS while the lighter organics and water flow upward. The lighter organics overflow the lip of the IFS containers into the main tank. When the main tank is full, the tank enters a settling cycle where the organics drift downward concentrating towards the bottom of the tank and collect near a sludge drain 105. Relatively organic free water is then typically removed as effluent from the top of the tank for further filtering (e.g. further filtering by membranes) by gravity and a weir or modulating valve 109, such as via a screen box (SBX) 117 as part of the decanting process. Organic rich water (sludge) is drawn from the bottom of the tank, such as by a sludge pump 107 from sludge drain 105. The resulting high organic content sludge is fed to a digester to generate methane.

It was realized that the energy generation efficiency of the EPT can be improved by introducing process control.

Figure 2:
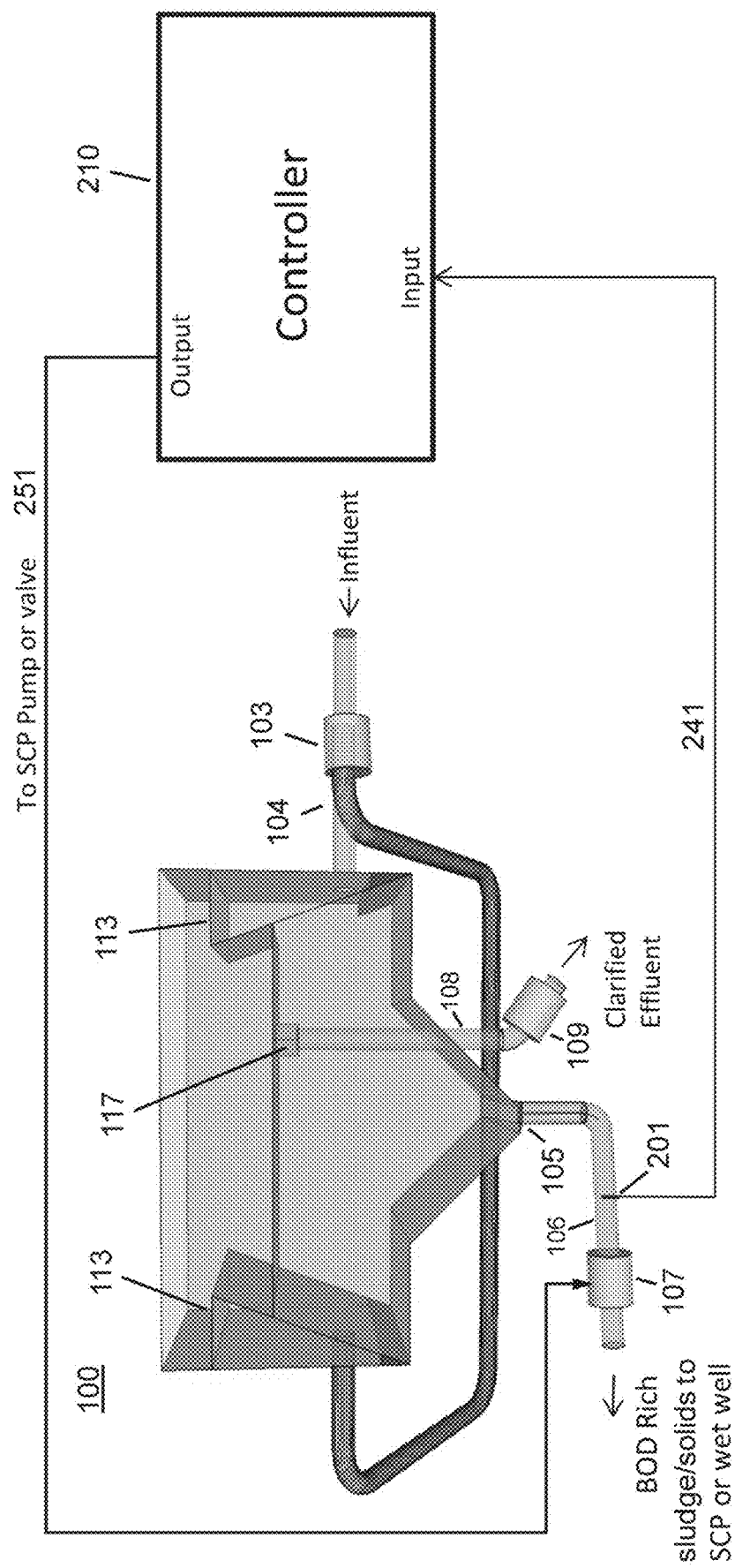
FIG. 2 shows a diagram of an exemplary EPT, sludge sensor, controllable valve or pump, and controller.

FIG. 2 shows a diagram of an exemplary EPT with associated controller 210. In one embodiment a sensor 201, typically a BOD sensor is placed in the sludge discharge pipe 106 that draws the sludge from the bottom of the EPT 100. The sensor is communicatively coupled to a controller via any suitable wired (e.g. cable 241) or wireless means. The valve and/or a pump 107 is also communicatively coupled to the controller 210 via any suitable wired (e.g. cable) or wireless means.

In typical embodiments, the sludge from the bottom of the EPT is sent on to a sludge classifying press (SCP) via a valve and/or a pump 107. The SCP cleans sludge, such as, by removing inorganic solids, and releasing encased organics.

In the embodiment of FIG. 2, the EPT system is usually operated with periods of influent flow and periods of sludge discharge. In a start/stop type EPT operation, there are typically two or more EPT in operation, so that, particularly during times of higher waste flows, waste water influent, usually wastewater, can be diverted to another EPT ready to accept more influent.

Example: At the start of the draw down from the bottom of the tank, the BOD concentration is high as measured by sensor 201 (typically about 3%, but dependent on factors such as settling time and the initial BOD concentration in the influent). Then, the BOD concentration as measured by sensor 201 decreases as water from higher in the tank reaches the outlet. Eventually the BOD concentration as measured by sensor 201 becomes too low (typically below about 1% for efficient BOD extraction. At this point, the removal of sludge is stopped by controller 201 by closing a valve or turning off pump 107, and any remaining organic poor supernatant is decanted from the top of the tank via SBX 117 and modulating valve 109, and the refilling process of the EPT tank 100 begins again. Thus, based on the BOD concentration input as measured by the sensor 201, controller 210 prevents low energy content liquid from flowing into the de-watering and digesting stages, by controlling valve or pump 107.

Settling times: In some embodiments, control of pumping rate based on BOD concentration measurement also improves settling times. Settling times are improved because the very small organic particles in the influent will naturally coagulate as the particles collide and stick together due to currents and Brownian motion. The larger coagulated particles are more substantial "targets" than the small particle BOD influent, so further coagulation and thus settling occurs faster if some coagulated particles are already present. By sensing the BOD concentration in the effluent pipe and stopping pumping before substantially all of the BOD has been removed, the EPT is "seeded" for the next settling cycle. Using the sensor to control pumping rate thus enables the "seeding" to occur at substantially optimum levels.

Additional sensors can enable still more sophisticated control and hence greater efficiency. For example, by adding flowmeters and one or more additional sensors such as one or more BOD concentration sensors to the influent pipes, the BOD concentration in the EPT tank can be estimated, such as by integration, to establish a substantially optimum settling time for each batch of waste water processed by an EPT tank 100.

Figure 3:
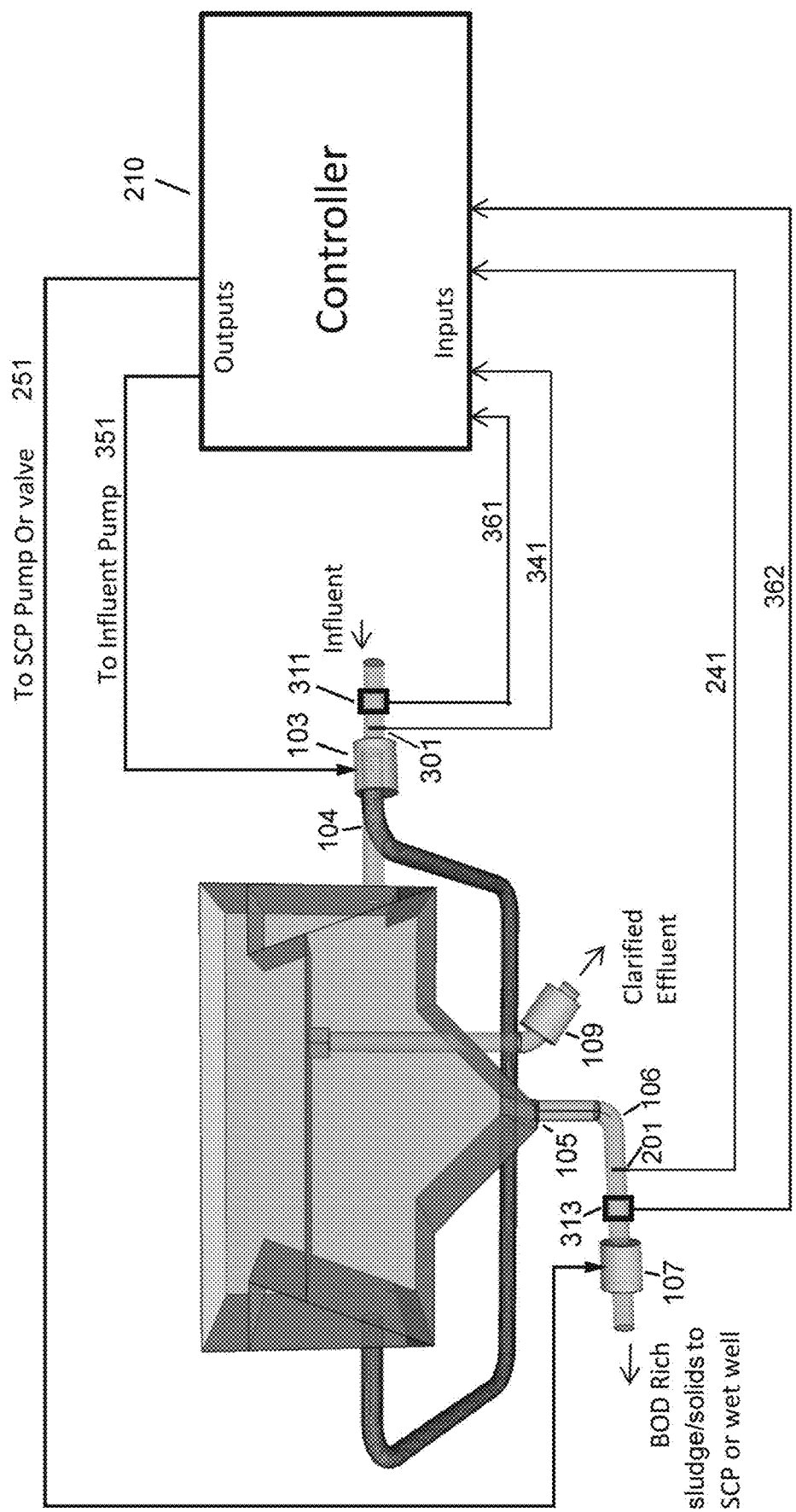
FIG. 3 shows another exemplary embodiment of an EPT tank system which measures both flow rate and BOD at both the influent inlet and at the sludge drain.

FIG. 3 shows another exemplary embodiment of an EPT tank 100 system which measures both flow rate and BOD at both the influent inlet and at the sludge drain 105 sludge discharge pipe 106. In the embodiment of FIG. 3, the BOD concentration is measured at the sludge drain 105 sludge discharge pipe 106 by sensor 201 which is communicatively coupled to controller 210 as in FIG. 2. Also, valve and/or a pump 107 is also communicatively coupled to the controller 210 as in FIG. 2. A sludge flowmeter 313, which is also communicatively coupled to controller 210 by any suitable means (e.g. cable 362), has been added to measure the flow rate in sludge discharge pipe 106. Also, now influent pump 103 can be controlled by controller 201 (e.g. by cable 351), and another sensor 301 which is communicatively coupled to controller 210 by any suitable means (e.g. cable 341) has been added to the influent inlet pipe 104 as well as a flowmeter 311 which is communicatively coupled to controller 210 by any suitable means (e.g. cable 361) to measure the influent flow rate in influent inlet pipe 104.

In the embodiment of FIG. 3, control is now based on both BOD measurements and flow rate measurements. The flow rate measurements allow controller 210 to calculate how much water is in the EPT tank 100 at any given time. The BOD concentration information from sensor 301 allows the controller to further calculate a quantity of BOD in the EPT tank 100 at any given time based on the concentration of BOD flowing into the EPT tank 100 and the quantity of fluid (typically mostly water) in the EPT tank 100.

Example: The influent flow meter 311 and the sludge flow meter 313, and influent sensor 301 and sludge sensor 201 provide flow rate and sensed measurements (typically BOD concentration) to the controller to provide input data to a process running on the controller 210. In one exemplary embodiment, controller 210 subtracts an effective number of COD/TSS from the Influent number of COD via the following formula (X-MGD×8.34×Y mg/l). When the concentration of COD in the tank becomes greater than a set point value, the sludge valve is opened (or an SCP pump is energized). The SCP valve or pump is then later stopped when the COD in the sludge drops below a field set concentration.

In other embodiments, if sensors are added to the clarified water stream it becomes possible to use mass balance equations to model the EPT tank 100 process and then to control an EPT tank 100 dynamically, such as by using variable speed pumps.

Figure 4:
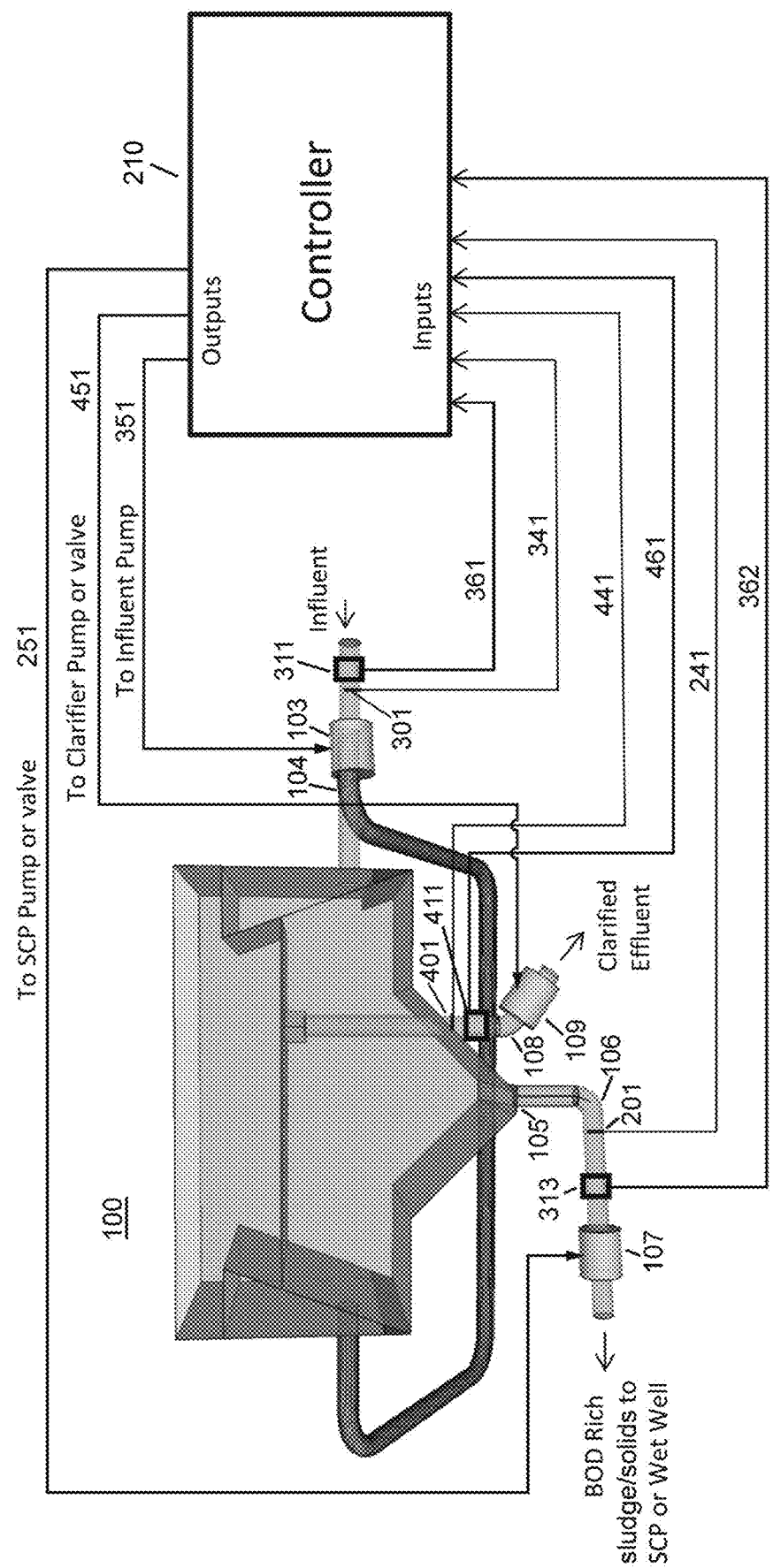
FIG. 4 shows an exemplary embodiment of an EPT tank system with an additional clarified effluent flowmeter and sensor.

FIG. 4 shows an exemplary embodiment of an EPT tank 100 system capable of such, proportional control. FIG. 4 adds a sensor 401 which is communicatively coupled to controller 210 by any suitable means (e.g. cable 441) (typically a BOD sensor) to the clarified effluent pipe 108 as well as communicatively coupling control of the modulating valve 109 which controls the flow of clarified effluent decanted from the influent pumped into EPT tank 100. Also, a flowmeter 411 which is communicatively coupled to controller 210 by any suitable means (e.g. cable 461) measures the flow rate of clarified effluent flowing out of EPT tank 100 via the clarified effluent pipe 108. Also, one or more pumps (e.g. influent pump 103) would typically be operable at variable speed for a continuous range of pumping speeds, and or one more valves (e.g. modulating clarified effluent valve 109) can be operated across a range of positions from closed to opened.

In a EPT tank 100 with proportional control, instead of the start/stop operation typical of the system of FIG. 2, influent always flows into the EPT tank 100 at a variable rate determined by a proportional process algorithm running on controller 210 or another computer communicatively coupled to controller 210. Similarly, clarified effluent typically flows continuously from the clarified effluent pipe 108, the instantaneous outflow rate of clarified effluent set by modulating valve 109 as controlled by controller 210. Also, the sludge discharge from sludge drain 105 through sludge pipe 106 can be controlled by valve or pump 107 as controlled by controller 210. Such control it typically executed by controller 210 substantially in real-time according to the process algorithm based on factors, such as, for example, the BOD of the sludge discharge as measured by sensor 201, the BOD of the clarified effluent as measured by sensor 401, and the BOD of the influent as measured by sensor 301. Also, flowmeter 311, flowmeter 313, and flow meter 411 provide input data to controller 210 so that the process algorithm can calculate and track the volume of fluid in EPT tank 100 at any given time.

Example: Controller 210 runs a multi-dimensional process control algorithm which receives as input data from sensor 201, sensor 301, sensor 401, flowmeter 311, flowmeter 313, and flowmeter 411. Such process control algorithms, while believed not to have been previously used in waste water treatment facilities, are well-known in the art of industrial controllers. The EPT tank 100 system has been running in a proportional control mode for some number of hours. The influent is continuously flowing into EPT tank 100 at a certain flow rate. The clarified effluent is flowing out at a certain flow rate, and the sludge is discharging at a certain rate. The volume of fluid (e.g. water with BOD content) in the EPT tank 100 is relatively stable and well below a maximum volume that EPT tank 100 can contain. The total influent is substantially equal to the rate of sludge removal and remove of clarified effluent.

Under proportional control, sensor 201 provides input data on the BOD concentration of the discharging sludge to the process control algorithm running on controller 210. In a hypothetical example, the sensor 201 BOD concentration is increasing causing controller 210 to slightly increase a flow of influent in an attempt to automatically correct the BOD concentration of the discharging sludge back to a desired setpoint or a desired range of BOD concentration. As the rate of influent inflow increases, so does the BOD concentration of the clarified effluent rises as measured by sensor 401. Controller 210 slows the rate of discharge (typically by gravity) of clarified effluent by controlling the modulating valve 109. Also, as the BOD concentration of the sludge discharge begins to fall back to within a desired range, the rate of influent which had been somewhat increased (e.g. by slightly increasing the speed of influent pump 103), can now be slightly reduced, and so on where the controller continuously adjusts flowrates, such as by controlling valve positions and pump speeds throughout the EPT tank 100 system by preprogrammed strategies of the process control algorithm running on controller 210 to maintain a plurality of parameter within desired limits.

Sensing BOD and COD: Chemical oxygen demand (COD) concentration in waste water is understood to include both inorganic particulates and organic matter. COD can be particulate or in solution and/or dissolved. However, because most of the COD in wastewater is typically organic matter, in wastewater applications as described hereinabove, COD can be substantially the same as BOD. Typically, the method of COD testing is chemical, versus biological for BOD measurements, and thus the scale is different with COD always being at least slightly greater than BOD (because the BOD concentration is a subset of the overall COD concentration).

Ultraviolet absorption (UVa) sensors, e.g. the UVa spectrometer (UVas), have been found to be reliable sensors for measuring BOD content real-time or near real-time in wastewater applications as described hereinabove. Some prior art COD and/or BOD testing is done at laboratories using waste-water samples and therefore such testing is not suitable for use in a real-time or near real-time control system. However, sensor technologies continue to improve and it is contemplated that more BOD/COD electronic or electrochemical sensors suitable for real-time or near real-time control applications will be available in the near term. Therefore, in other embodiments, any suitable sensors and sensor methods can be used to measure BOD concentration or BOD content. It is also contemplated that total suspended solids (TSS) sensors, turbidity (TRB) sensors, and chemical oxygen demand (COD) sensors can be used for any of the sensors as described hereinabove.

The systems described hereinabove typically use semi positive displacement or fast start displacement pumps to achieve response times suitable for efficient operation of the control systems described hereinabove. Prior art waste water treatment systems, without any need for fast or precise control generally use centrifugal pumps.

Various components of EPT Tanks and related waste water treatment plants (WWTP) have been described by Wright and ClearCove Systems, Inc. The application incorporates the following United States patents and pending applications that disclose systems and processes for primary clarification. U.S. Pat. No. 7,972,505, PRIMARY EQUALIZATION SETTLING TANK (the '505 patent), to Wright; U.S. Pat. No. 8,225,942 to Wright, SELF-CLEANING INFLUENT FEED SYSTEM FOR A WASTEWATER TREATMENT PLANT; U.S. Pat. No. 8,398,864 SCREENED DECANTER ASSEMBLY FOR A SETTLING TANK (the '864 patent) to Wright; co-pending U.S. patent application Ser. No. 14/142,197 METHOD AND APPARATUS FOR A VERTICAL LIFT DECANTER SYSTEM IN A WATER TREATMENT SYSTEM by Wright (the '197 application); co-pending U.S. patent application Ser. No. 14/142,099 FLOATABLES AND SCUM REMOVAL APPARATUS FOR A WASTE WATER TREATMENT SYSTEM by Wright; co-pending U.S. patent application Ser. No. 14/325,421 IFS AND GRIT BOX FOR WATER CLARIFICATION SYSTEMS by Wright (the '421 application); co-pending U.S. patent application Ser. No. 14/490,944 SYSTEM AND METHOD USING SENSORS TO CONTROL A VERTICAL LIFT DECANTER SYSTEM IN A WATER TREATMENT SYSTEM by Wright (the '944 application); co-pending U.S. patent application Ser. No. 14/503,441 METHOD AND APPARATUS FOR SEPARATING STABLE BIOLOGICAL MATERIALS FROM AN INFLUENT STREAM by Wright (the '441 application); co pending U.S. patent application Ser. No. 14/471,247 METHOD AND APPARATUS FOR USING AIR SCOURING OF A SCREEN IN A WATER TREATMENT FACILITY by Wright (the '247 application); co-pending U.S. patent application Ser. No. 14/503,455 APPARATUS FOR SEPARATING MATERIALS FROM AN INFLUENT STREAM by Wright (the '455 application); co-pending U.S. patent application Ser. No. 14/503,494 APPARATUS FOR ELECTIVELY TREATING SLUDGE TO REMOVE COMPONENTS THEREFROM by Wright (the '494 application); co-pending U.S. patent application Ser. No. 14/503,526 APPARATUS FOR TREATMENT OF SLUDGE by Wright (the '526 application), and co-pending U.S. patent application Ser. No. 14/584,228 SYSTEM FOR CONTROLLING WASTE WATER TREATMENT IN A WASTE WATER TREATMENT PLANT by Wright (the '526 application). All of the patents and applications referenced by this paragraph are incorporated herein by reference in their entirety for all purposes.

A controller as used herein typically includes at least one computer processor. A computer processor, synonymous with microprocessor and processor, typically includes at least one microcomputer, a microcontroller, a digital signal processor (DSP), field programmable array (FPGA) chips, reduced instruction set circuits (RISC), or application specific integrated circuits (ASIC) etc. It is understood that memory used by the microcomputer, including for example instructions for data processing coded and provided from a non-volatile memory or storage as "firmware" which can reside in memory physically inside of a microcomputer chip or in memory external to the microcomputer or in a combination of internal and external memory. It is also understood that a FPGA, RISC, or ASIC can perform controller functions, either in hardware logic, software emulation of a microcomputer, or by a combination of the two. Apparatus having any of the features described herein can operate entirely on one controller or can include more than one controller. Analog input signals can typically be digitized by a standalone analog to digital converter (ADC) or one or more ADCs or multiplexed ADC channels can reside within or be communicatively coupled to the controller. Similarly, a controller can typically generate analog output and control voltage, currents (e.g. industrial 4-20 mA control loops), etc. by use of a digital to analog converter (DAC). Sensors, such as, for example, BOD sensors, can be communicatively coupled to the controller by any suitable wired or wireless means (analog or digital). Controlled equipment, such as, for example, controlled pumps and/or controlled valves can similarly be communicatively coupled to the controller by any suitable wired or wireless means (analog or digital). Some sensors and/or controlled equipment can communicate wired or wirelessly with a controller by any suitable digital interface ranging from serial interfaces such as RS-232, RS485, to BlueTooth™, and WiFi™. In a waste fluid treatment plant either one or more controllers or a general purpose computer communicatively coupled to one or more controllers can execute a SCADA (supervisory, control and data acquisition) program.

General purpose programmable computers useful for controlling plants, facilities, instrumentation, recording signals and analyzing signals or data, such as by being communicatively coupled to one or more controllers according to the present description can be any of a personal computer (PC), a microprocessor based computer, a portable computer, or other type of processing device. The general purpose programmable computer typically comprises a central processing unit, a storage or memory unit that can record and read information and programs using machine-readable non-volatile storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of LINUX, etc. Computational results obtained in the operation of the general purpose computer can be stored to a non-volatile memory for later use, and/or can be displayed to a user.

Software and/or firmware for a controller and/or computer coupled to the controller can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of controlling an enhanced primary treatment (EPT) system comprising the steps of:
   providing an EPT system having an EPT settling tank including a controller running a process algorithm configured to read at least a sludge sensor, and to control at least one of a sludge discharge valve and a sludge discharge pump coupled to said controller;
   measuring by use of said sludge sensor a biochemical oxygen demand content (BOD) concentration of a sludge discharge from a settling tank of said EPT system with a sensor communicatively coupled to a controller;
   controlling by said controller, said at least one of a sludge discharge valve and a sludge discharge pump in response to said BOD concentration of a sludge discharge to automatically maintain a desired BOD concentration of said sludge discharge;
   wherein said step of providing further comprises providing a clarified effluent sensor, and a clarified effluent flowmeter, and said step of measuring further comprises measuring a clarified effluent flow rate, and measuring by use of said clarified effluent sensor a BOD concentration of a clarified effluent fluid decanted by said EPT settling tank, and said step of controlling further comprises controlling a modulating clarified effluent valve in response to said BOD concentration of a sludge discharge, said BOD concentration of the influent fluid, said flow rate of said sludge discharge, and said flow rate of said influent fluid to automatically maintain a desired BOD concentration of said sludge discharge and a volume of influent fluid to be decanted within said EPT settling tank, and said BOD concentration of the clarified effluent.

2. The method of claim 1, wherein providing said effluent sensor comprises providing a effluent sensor from the group consisting of an ultraviolet absorption (UVa) spectrophotometer, a total suspended solids (TSS) sensor, a turbidity (TRB) sensor and a chemical oxygen demand (COD) sensor.

3. The method of claim 2, wherein said step of controlling comprises controlling at least one variable speed pump or at least one variable position valve under proportional control.

4. The method of claim 2, wherein providing said sludge sensor comprises providing a sludge sensor from the group consisting of an ultraviolet absorption (UVa) spectrophotometer, a total suspended solids (TSS) sensor, a turbidity (TRB) sensor and a chemical oxygen demand (COD) sensor.

5. The method of claim 1, wherein said step of providing further comprises providing an influent fluid sensor, an influent flowmeter, and a sludge flowmeter, and said step of measuring further comprise measuring a sludge flow rate, measuring an influent fluid flow rate, and measuring by use of said influent sensor a BOD concentration of the influent fluid, and said step of controlling further comprises controlling an influent fluid pump and said at least one of a sludge discharge valve and a sludge discharge pump in response to said BOD concentration of a sludge discharge, said BOD concentration of the influent fluid, said flow rate of said sludge discharge, and said flow rate of said influent fluid to automatically maintain a desired BOD concentration of said sludge discharge and a volume of influent fluid to be decanted within said EPT settling tank.

6. The method of claim 1, wherein providing said influent sensor comprises providing a influent sensor from the group consisting of an ultraviolet absorption (UVa) spectrophotometer, a total suspended solids (TSS) sensor, a turbidity (TRB) sensor and a chemical oxygen demand (COD) sensor.

* * * * *